United States Patent [19]

Dohrmann et al.

[11] 4,318,070
[45] Mar. 2, 1982

[54] SPRING BIASED ACTUATOR FOR A THERMAL DELAY VALVE OR SWITCH

[75] Inventors: Rolf Dohrmann, Neuss; Ulrich Henke, Alsdorf; Wojciech Marusiak, Düsseldorf, all of Fed. Rep. of Germany

[73] Assignee: Pierburg GmbH & Co. KG, Neuss, Fed. Rep. of Germany

[21] Appl. No.: 109,267

[22] Filed: Jan. 3, 1980

[30] Foreign Application Priority Data

Jan. 31, 1979 [DE] Fed. Rep. of Germany ....... 2903561

[51] Int. Cl.³ ............................................ H01H 61/02
[52] U.S. Cl. ..................................... 337/3; 261/39 E; 337/13; 337/53; 337/107; 337/354
[58] Field of Search ...................... 337/1, 3, 12, 13, 52, 337/53, 89, 102, 107, 343, 354, 365; 123/588; 261/39 E

[56] References Cited

U.S. PATENT DOCUMENTS

| | | | |
|---|---|---|---|
| 2,440,709 | 5/1948 | Young | 337/1 |
| 2,543,040 | 2/1951 | Mertler | 337/89 |
| 3,489,976 | 1/1970 | Marcoux | 337/102 |

FOREIGN PATENT DOCUMENTS 2453757 5/1976 Fed. Rep. of Germany .
1513803 9/1975 United Kingdom .

*Primary Examiner*—William H. Beha, Jr.
*Attorney, Agent, or Firm*—Toren, McGeady & Stanger

[57] ABSTRACT

An actuator for use as part of an electrically heated thermal delay valve (FIG. 1) or switch (FIG. 2) includes a thermally responsive plate (12) the periphery of which is fixed and the central part of which forms a temperature-dependent control element. The actuator also includes a metal carrier plate (9) which has a PTC element (10) mounted on it and which is free to move in a direction normal to its surface between stop abutments, and at least one spring (11) which electrically contacts the PTC element (10) and biases the carrier plate (9) towards the thermally responsive plate (9) to ensure that it is constantly in thermal contact with the carrier plate (10). This ensures that a direct thermal contact between the PTC element and the thermally responsive plate is constantly maintained which results in consistently reproducible functions being achieved with the apparatus by virtue of this direct thermal contact. The thermally responsive plate (9) may be biased towards the carrier plate (10).

11 Claims, 2 Drawing Figures

SPRING BIASED ACTUATOR FOR A THERMAL DELAY VALVE OR SWITCH

This invention relates to an actuator for use as part of an electrically heated thermal delay valve or switch including a thermally responsive plate the periphery of which is fixed and the central part of which forms a temperature-dependent control element, and a metal carrier plate which is heated by a PTC element. The central part of the thermally responsive plate forms the flow control element of the valve or the actuating element of the switch.

Such an actuator and apparatus is disclosed in the German Offenlegungsschrift No. 24 53 757 and United Kingdom Pat. No. 1,513,803 which relate to a valve for use with internal combustion engines. This known thermal delay valve performs a specific function for a specified period of time, and then shuts down. Valves of this kind may be used in motor vehicles.

In vehicles it is particularly important to obtain enrichment of the fuel-air mixture during a specific period of time after the ignition has been switched on. Such fuel enrichment can be obtained by a vacuum-actuated thermal delay valve in which the operating period is controlled by a thermally responsive plate which is heated by a PTC element.

Known actuators of this kind suffer from the disadvantage that an air gap of variable size is formed between the thermally responsive plate and the PTC heating element or an interposed carrier plate, through which gap the thermally responsive plate is heated by radiation. Differences in the width of the air gap result in substantial deviations of the operating parameters of the valves from those required.

According to this invention an actuator for use in an electrically heated thermal delay valve or switch includes a thermally responsive plate the periphery of which is fixed and the central part of which forms a temperature-dependent control element, a metal carrier plate having a PTC element mounted on it, and being free to move in a direction normal to its surface between stop abutments, and at least one spring which electrically contacts the PTC element and biases the carrier plate towards the thermally responsive plate to ensure that it is constantly in thermal contact with the carrier plate.

A PTC element is an electrical component with a positive resistance temperature coefficient, and is usually formed by a p.c.t. thermistor.

The invention ensures that a direct thermal contact between the PTC element and the thermally responsive plate is constantly maintained. Consistently reproducible functions can be achieved with the apparatus by virtue of this direct thermal contact.

This effect is improved still further not only by the application of spring bias on the carrier plate in the direction towards the thermally responsive plate but also by biasing the latter towards the carrier plate by at least one spring. Preferably the thermally responsive plate is formed by a snap-acting bimetal plate. The spring or springs used to urge the carrier plate and the bimetal plate together and the stop abutments to restrict the movement of the carrier plate are preferably matched to the characteristics of the snap-action bimetal plate so that the carrier plate bears on one of the stop abutments immediately prior to snapping over of the bimetallic plate. Such matching is convenient because the springs will then be neither too weak to ensure metal-to-metal thermal contact until the bimetallic plate snaps over nor will they be so strong as to advance or delay the snap over time of the bimetallic plate.

Two particular examples of devices in accordance with this invention will now be described with reference to the accompanying drawings; in which.

Figure 1:
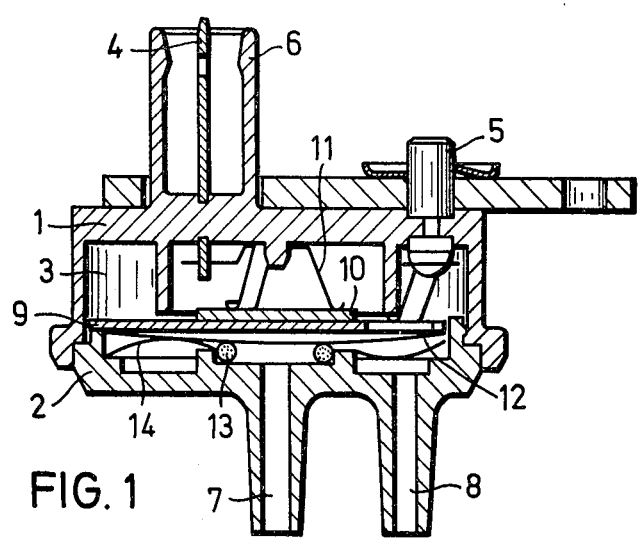
FIG. 1 is a cross-section through a thermal delay valve.

The thermal delay valve illustrated diagrammatically in FIG. 1 can be used in a pneumatic system. In the example a casing top 1 is formed by injection moulding, from plastics material and is connected in a fluid-tight manner to a casing bottom 2, which is also formed by injection moulding. The casing top 1 and the casing bottom 2 enclose a chamber 3. The parts or connections 4 and 5 for electrical contacts and a socket 6 for a plug-in connection are injection moulded into the casing top 1. The casing bottom 2 is provided with pneumatic connections 7 and 8 for the supply and discharge of a fluid.

A metal carrier plate 9, having a PTC heating element 10 mounted on it, is received in the chamber 3 and is able to slide freely in the axial direction or in the direction of the normal to its surface. The PTC element 10 is connected to the terminal 4 by means of spring contacts or electrically conductive springs 11.

By conducting electrical current to the PTC heating element 10 by the springs 11 axial displacement of the carrier plate 9 together with the PTC element 10 is permitted without impairing or separating the contacts. One of the principle features of the invention, is that the carrier plate 9 is supported in the chamber 3 of the casing so as to be slidable in a direction normal to the carrier plate surface.

A bimetallic disc 12 is arranged beneath the carrier plate. The bimetallic disc is constructed so that in a first working range or temperature range its external circumference bears on the carrier plate 9 and, as a result of its curvature, seals against a ring seal 13 so that in this condition communication between the pneumatic connections 7 and 8 is blocked. A preferred feature of this invention is that the bimetallic disc 12 is constantly thrust against the carrier plate 9 by at least one sping 14 which is supported between the casing bottom 2 and the disk 12, and this is true even when the disc is in the condition in which it is downwardly curved towards and seats on the ring seal 13. This means that a constant metal-to-metal surface contact is established between the bimetallic disc 12 and the carrier plate 9 resulting in a good thermal contact between them.

The operation of the thermal delay valve shown in FIG. 1 is as follows:

In the initial state, communication between the connection 7, to which a vacuum is applied via the chamber 3 and the connection 8, is closed by means of the curved bimetallic disk 12 which seals against the ring seal 13. The spring 14 ensures that the bimetallic disk 12 also bears constantly on the carrier plate 9 which, is arranged so as to slide freely in the chamber 3 between stop abutments or means in the casing adapted to restrict sliding but is biased towards the disk 12 by the spring 11.

When the electric supply to the PTC element 10 is rendered operational, for example by switching on the ignition in a motor vehicle, the PTC element 10 is heated, and simultaneously heats the carrier plate 9 connected to the element 10. The atmosphere disposed in the chamber 3 is also heated to a small extent. The bimetallic disc 12 is heated principally by metal-to-metal thermal contact with the carrier plate 9 but also by thermal convection through the atmosphere in the chamber 3, until the disc snaps over, as a result of its differential expansion, and this opens communication between the two connections 7 and 8. The carrier plate is provided with a plurality of openings to reduce thermal conduction in the radial direction between the carrier plate 9 and the casing parts 1 and 2.

The axial movement of the carrier plate 9 ensures that the bimetallic disk 12 is relieved of spring forces when it snaps over into its other position. An advantageous consequence of this is that the necessary time which has to elapse between switching on of an electric supply circuit, for example ignition of a motor vehicle, and until the bimetallic disc 12 snaps over, is repeatable with substantial uniformity. Heating of the bimetallic disc 12 via the atmosphere of the chamber 3 additionally influences the switching time to a desirable degree. This important advantage of the thermal delay valve according to this invention, compared with known devices of this kind results from the fact that at no time is there an air gap with a correspondingly undefined thermal transfer between the bimetallic disc 12 and the carrier plate 9.

Figure 2:
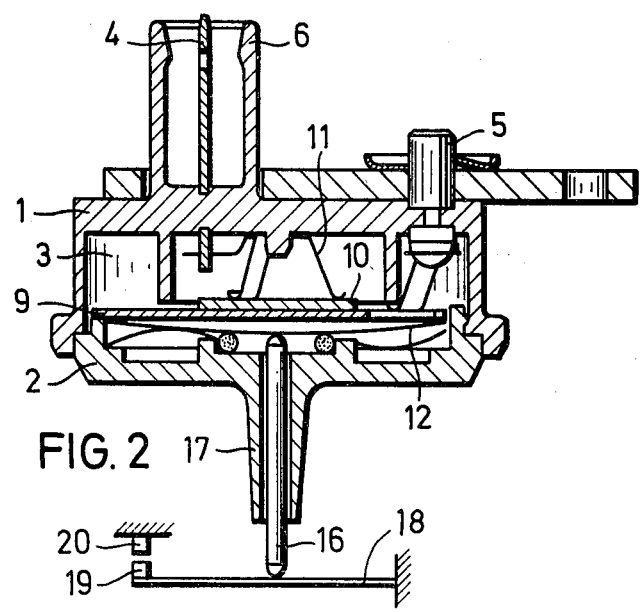
FIG. 2 is a cross-section through a thermal delay switch.

FIG. 2 shows a thermal delay switch, including an actuator which corresponds to that shown in FIG. 1. The differences between the thermal delay valve shown in FIG. 1 and the switch shown in FIG. 2 are confined to the region beneath the bimetallic disc 12.

In the thermal delay switch the bimetallic disc 12 actuates a pin 16 which is slidably supported in a guide 17, formed in the casing bottom 2, and the end of the pin which is farthest from the bimetallic disc 12 bears on a spring member 18 of a known spring switch having switch contacts 19 and 20. The guide 17 is constructed in a manner similar to that of the pneumatic connection 7 shown in FIG. 1.

When the central region of the bimetallic disc 12 snaps over, the pin 16 is allowed to move by an amount which corresponds to the snap over movement of the disc 12 which allows the contact end 19 of the spring member 18 to touch the fixed contact 20 and close the spring switch.

The directly opposite functions can be obtained with the examples by reversing the installation of the bimetallic disc 12.

We claim:

1. An actuator for use in an electrically heated thermal delay valve or switch, said actuator comprising a housing, a thermally responsive plate, a periphery of said thermally responsive plate being fixed to said housing, a central part of said thermally responsive plate forming a temperature-dependent control element, a metal carrier plate, a PTC element mounted on said metal carrier plate, said metal carrier plate and said PTC element being located in said housing and being free to move in a direction normal to said carrier plate, and at least one spring, said at least one spring electrically contacting said PTC element and biasing said carrier plate towards said thermally responsive plate, whereby said carrier plate is constantly urged into thermal contact with said thermally responsive plate.

2. The actuator of claim 1, which further includes at least one further spring acting on said thermally responsive plate to bias said thermally responsive plate towards said carrier plate.

3. The actuator of claim 2, wherein said thermally responsive plate is formed by a snap-acting bimetal plate.

4. The actuator of claim 3, wherein said at least one spring and said at least one further spring and said housing are matched to said snap-action bimetal plate whereby said carrier plate engages said housing immediately prior to said bimetal plate snapping over.

5. The actuator of claim 1, wherein said carrier plate includes openings to reduce radial heat flow.

6. The actuator of claim 1, wherein said housing is a two part casing injection moulded from plastics material and wherein electrical contacts are injection moulded into the casing top.

7. A thermal delay valve comprising a housing, a thermally responsive plate, a periphery of said thermally responsive plate being fixed to said housing, a central part of said thermally responsive plate forming a temperature-dependent control element, a metal carrier plate, a PTC element mounted on said metal carrier plate, said metal carrier plate and said PTC element being located in said housing and being free to move in a direction normal to said carrier plate, at least one spring, said at least one spring electrically contacting said PTC element and biasing said carrier plate towards said thermally responsive plate, whereby said carrier plate is constantly urged into thermal contact with said thermally responsive plate, a fluid duct, and a valve seat terminating said fluid duct, said central part of said thermally response plate being arranged to close against said valve seat to close said fluid duct.

8. The thermal delay valve of claim 7, wherein at least one further spring is provided acting on said thermally responsive plate to bias said thermally responsive plate towards said carrier plate.

9. A thermal delay switch comprising a housing, a thermally responsive plate, a periphery of said thermally responsive plate being fixed to said housing, a central part of said thermally responsive plate forming a temperature-dependent control element, a metal carrier plate, a PTC element mounted on said metal carrier plate, said metal carrier plate and said PTC element being located in said housing and being free to move in a direction normal to said carrier plate, at least one spring, said at least one spring electrically contacting said PTC element and biasing said carrier plate towards said thermally responsive plate whereby said carrier plate is constantly urged into thermal contact with said thermally responsive plate, and a pair of switch contacts, movement of said central part of said thermally responsive plate being arranged to open and close said pair of switch contacts.

10. The thermal delay switch of claim 9, wherein at least one further spring is provided acting on said thermally responsive plate to bias said thermally responsive plate towards said carrier plate.

11. The thermal delay switch of claim 9, which also includes a push rod, said push rod being interposed between said central part of said thermally responsive plate and said switch contacts to cause said movement of said central part to open and close said switch contacts.

* * * * *